US006185578B1

(12) United States Patent
Yokote et al.

(10) Patent No.: US 6,185,578 B1
(45) Date of Patent: Feb. 6, 2001

(54) PROGRAM CREATION APPARATUS, PROGRAM CREATION METHOD, AND RECORDING MEDIUM CONTAINING A SOFTWARE PROGRAM FOR IMPLEMENTING THE METHOD

(75) Inventors: Yasuhiko Yokote; Junichi Nakata, both of Tokyo (JP)

(73) Assignee: Sony Corporation, Tokyo (JP)

( * ) Notice: Under 35 U.S.C. 154(b), the term of this patent shall be extended for 0 days.

(21) Appl. No.: 09/168,043

(22) Filed: Oct. 7, 1998

(30) Foreign Application Priority Data

Oct. 17, 1997 (JP) .................................................... 9-285448

(51) Int. Cl.[7] ................................ G06F 17/30; G06F 9/00
(52) U.S. Cl. .............................. 707/203; 707/100; 717/3; 709/106
(58) Field of Search ..................................... 707/100, 101, 707/102, 103, 104, 203; 709/106; 717/3, 10, 1

(56) References Cited

U.S. PATENT DOCUMENTS

| | | | |
|---|---|---|---|
| 4,809,170 | * 2/1989 | Leblang et al. | 717/3 |
| 5,649,200 | * 7/1997 | Leblang et al. | 717/3 |
| 5,864,862 | * 1/1999 | Kriens et al. | 707/103 |
| 5,878,262 | * 3/1999 | Shoumura et al. | 717/10 |
| 6,052,525 | * 4/2000 | Carlson et al. | 717/1 |

* cited by examiner

Primary Examiner—Thomas G. Black
Assistant Examiner—Frantz Coby
(74) Attorney, Agent, or Firm—Limbach & Limbach LLP

(57) ABSTRACT

The present invention provides a program creation apparatus for a software development system capable of deleting some of modules during an execution. A header file 30 and a source file 31 are compiled by a compiler 33 using a compile information 32 from a compile processing block 34 and the header file 30, so as to create an object file 35. Using a linker 38, a link information 37, and a library file 36, the object file 35 is linked in a link processing block 39 so as to become an execution-formatted file 40. A composite execution-formatted file information 41 provides an information about the execution-formatted file 40 to be contained in a composite execution-formatted file format file 43. According to this information, a composite execution-formatted file creation block 42 is supplied with an initialization program 78 and a plurality of execution-formatted files 40 and outputs the single composite execution-formatted file format file 43.

11 Claims, 18 Drawing Sheets

PROGRAM CREATION APPARATUS, PROGRAM CREATION METHOD, AND RECORDING MEDIUM CONTAINING A SOFTWARE PROGRAM FOR IMPLEMENTING THE METHOD

BACKGROUND OF THE INVENTION

1. Field of the Invention

The present invention relates to a program creation apparatus for use in a software development system to be built in an apparatus.

2. Description of the Prior Art

These years, various electronic apparatuses are controlled by a built-in microprocessor and software. Moreover, various electronic apparatuses have been developed to be connected to a telephone line or the like for communication in a network Furthermore, there has also been developed an apparatus having a function for transmitting and receiving a control software module through a network.

For software to be built in such an apparatus, it is considered to support communication and a software module transmission and reception from the level of an operating system (OS).

In an ordinary OS to be built in, a system module is delivered as a library. Some files depending on hardware may be provided as source files.

When extending a program function in a program development procedure, an additional library is created. Because a system file is a library, it is linked together with a program developed by a user. For replacing a module during a program execution, an additional module is read externally to the linked system program and the user program.

Here, explanation will be given on a software development system for an ordinary software to be built in. The explanation will be given, assuming a case using the C language as the programming language, but the basic procedure can also be applied to a case using other languages.

FIG. 1 shows an example of software development system for an ordinary built-in OS.

A header file 10 and a source file 11 are prepared by a user. These files may be created by the user or may be provided by a software development system.

A compile information 12 is an optional information for specifying a compile form to a compiler 13 such as a CPU type and optimization specification.

A compile processing block 14 compiles the source file 11 to create an object file 15, using a compiler 13 appropriate for a target hardware, a compile information 12, and a header file 10.

A library file 16 may be a library provided by a software developement system or created in advance by a user.

A link information 17 is an optional information for specifying a link form to a linker 18.

A link processing block 19 links a plurality of object files 15 to create a single execution-formatted file 20, using a linker 18 appropriate for a target hardware, the linke information 17, and the library file 16.

Here, explanation will be given on a software development procedure for an ordinary built-in software.

FIG. 2 shows an example of the software development procedure for an ordinary built-in OS.

A system library 21 is a library file including a program for implementing a function of the OS.

A system source file 22 is a file for providing the OS function implementing program as a source code. This system source file 22 is compiled by the compile processing block 14 so as to create an object file 23. It should be noted that such a system source file 22 is usually delivered for a hardware-depending portion.

A user source file 24 is a source file created for apparatus control by a user. This user source file 24 is compiled to create a compile file 25. The system library 21, the object file 23, and the object file 25 are linked in the link processing block 19 so as to create a single execution-formatted file 20.

FIG. 3 shows an internal structure of an execution-formatted file as an example of the aforementioned conventional execution-formatted file.

An internal structure information 61 is located at a head of the execution-formatted file 20 and contains an information for identifying a following content and its length. By analyzing this internal structure information 61, it is possible to extract a necessary information from the following part.

A text section 62, as shown in FIG. 2, is a program code collected from the system library 21, the object file 23, and the object file 25, and combined.

An initialization section 63 is an initial value data of variables which have been collected and combined in the same way.

An initialization-free (not required) data section 64 is a data area for variables having no initial values determined, which have been collected and combined in the same way.

A debug information section 65 is an area for saving a symbol information such as a variable name for program debug. In a built-in software, it is usual that the linker is specified to delete this debug information section 65 at a final stage.

As a format of such an execution-formatted file 20, for example, ELF (Executable Linking Format) and COFF (Common Object File Format) are known.

Moreover, the following can be exemplified as the OS.

In an ordinary computer OS, a system module is delivered mainly as an executable file format. Moreover, in some OS, a source file is similarly delivered, which is compiled to be converted into an executable file format.

When extending a program function during a program development procedure, a source file formatted as an executable file is added. Alternatively, an additional file for extending the program function is provided in a library format such as DLL (Dynamic Link Library) which is executed via an OS during a user program execution.

If the system file is an executable file, the system file is read into a memory via the OS when a user requires a program.

When replacing a module during a program execution, the OS reads a new fle into memory, discarding the memory content corresponding to a conventional file.

Such a built-in software development system based on an ordinary computer OS is also provided.

Moreover, a so-called Java is used as a programming language. In this case, the system module is delivered mainly as an executable file format or byte code (intermediate code).

The byte code is executed as it is directly by an interpreter or converted via a compiler into an executable file format.

The executable file format has an internal structure similar to the one shown in FIG. 3, for example, where one file has only one execution program. It should be noted that a plurality of execution programs may be compressed/ combined into a single file but in this case also, the file format shown in FIG. 3 is maintained.

When extending the program function during a program development, a byte code file is added.

Moreover, when replacing a module during a program execution, the OS reads a new file into a memory, discarding the memory content corresponding to a conventional file.

Such a software development system is provided for a built-in type in an apparatus.

In the aforementioned conventional operating system (OS), if a replacement of a module is considered in implementation into an apparatus, there arise following problems.

(1) In an ordinary OS to be built in, a user module and a system module are linked into a single execution-formatted file and accordingly, it is difficult to dele a particular module during execution of the execution-formatted file. For example, a text section containing a program code of a system module is linked to a text section of a user module, and they cannot be separated from each other.

(2) In an ordinary computer OS, management of a replacement module is carried out in a file system, and reading into a memory and deletion from the memory is carried out when required. In this method, however, the file system should be provided by a kernel, which in turn increases the kernel size and the memory size. This is not preferable in a built-in system having a strict restriction on the emory size.

(3) If each of the modules is in the execution format outputted from an ordinary compiler, the file size is considerably large, requiring more capacity then necessary when stored in a ROM (read only memory). For example, a file has an area filled with 0 for a data which need not be initialized with a particular value during an execution. This area is necessary during an execution but can be deleted while the file is preserved. Upon execution, it is possible to allocate an area of the same size initialized by 0. A part of ROM size is occupied by such an unnecessary information. This also brings about a cost increase when a number of files are required.

Moreover, in a conventional built-in software development system, following problems are caused if consideration is taken on the implementation into an apparatus and replacement of some modules afterward.

(4) In an ordinary built-in operating system development system, it is impossible to create a program in a format which enables to delete some of the modules.

(5) When a number of modules are present, it is necessary to read the respective modules into a memory during a built-in software development. This takes a considerable time if the number of execution-formatted files is large.

(6) An area which can be deleted and reconstructed upon execution is not deleted from an execution-formatted file which is outputted from a compiler. Accordingly, each module requires a large file size.

(7) When an additional module is provided in a library format, it is difficult to create a file in such a module that some of the modules can be deleted during execution. If the additional module is provided as a source file, it is possible to create a file in such a format that some of he modules can be replaced during execution. However, this depends on a user who should compile the system source file appropriately.

SUMMARY OF THE INVENTION

It is therefor an object of the present invention to provide a software development system of a a built-in system which can preferably be used when using an operating system having a function for replacing some of the modules afterward.

DETAILED DESCRIPTION OF PREFERRED EMBODIMENTS

Hereinafter, description will be directed to a program creation apparatus according to preferred embodiments of the present invention with reference to the attached drawings. It should be noted that the program creation apparatus according to the present invention has a main element constituted in general by a software program which is recorded on a recording medium. The software program is supplied to a computer apparatus from the recording medium or via a transfer medium so as to implement the program creation apparatus.

[1] First Embodiment

Firstly, explanation will be given on a software development system as a first embodiment of the program creation apparatus according to the present invention. In the explanation given below, the C language is used as an example, but the basic processing can also be applied to a case using other language.

Figure 4:
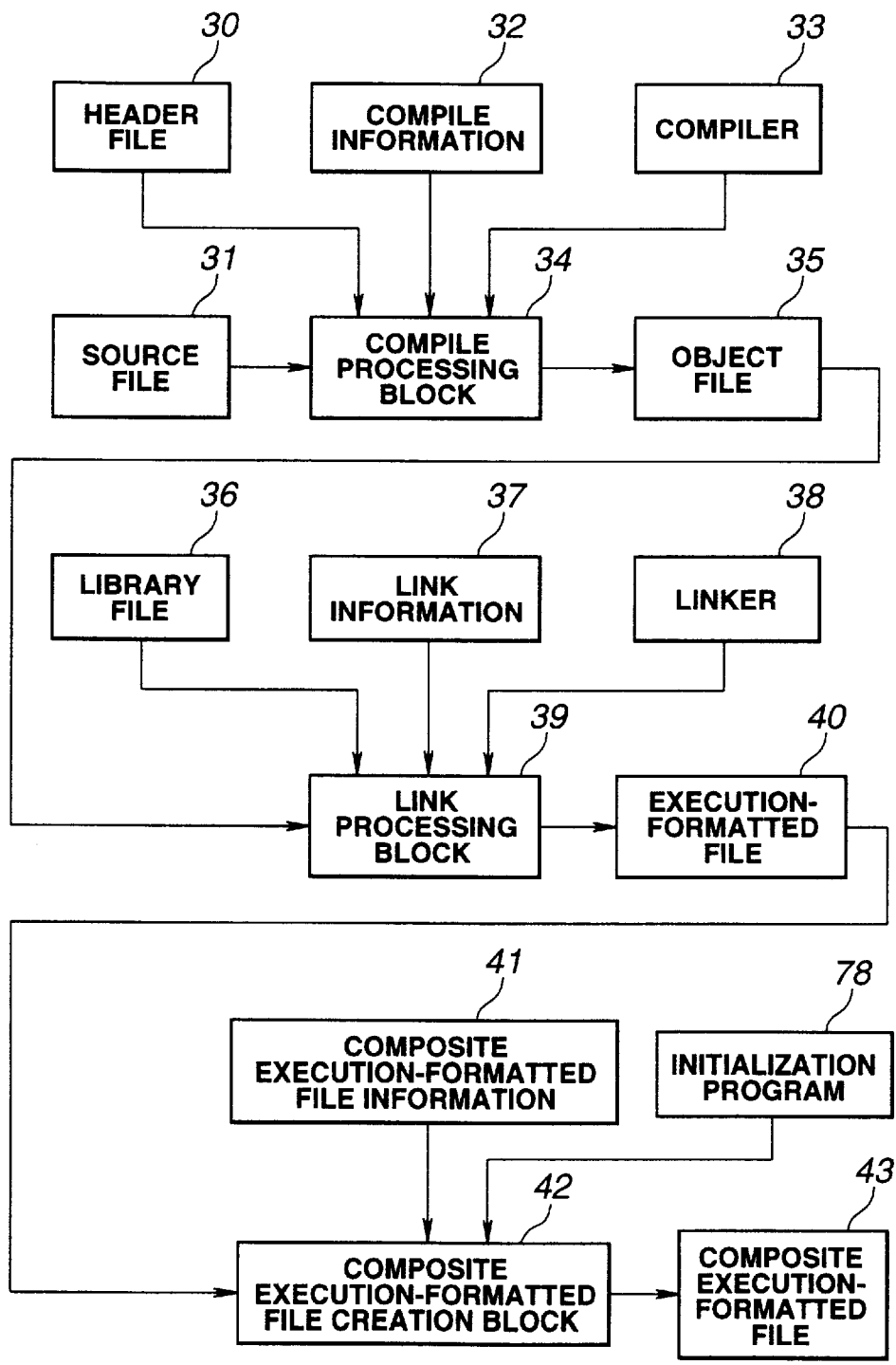
FIG. 4 is a block diagram showing a configuration example of a software development system according to a first embodiment of the present invention.

FIG. 4 shows a configuration example of the software development system according to the present invention.

A header file and a source file 3 are files to be prepared by a user. These files may be created by the user or may be provided by the system.

A compile information 32 is an optional information for specifying a compile format for a compiler 33 such as a target hardware CPU type and an instruction of optimization. This compile information 32 is created by a system setting block (not depicted) and contains information as follows:
  a compiler name and its directory
  a compile option for specifying CPU of the hardware for operating the program
  a directory information of a header file to be read in
  a compile option whether a floating point calculation unit is used
  a definition of a value of macro for preprocessor contained in the source file A compile processing block 34 uses the compiler 33, the compile information 32, and the header file 30 which are appropriate for a target hardware, so as to compile the source file 31 to create an object file 35.

A library file 36 may be a library provided by the system or a library created in advance by the user.

A link information 37 is an optional information for specifying a link format for a linker 38. This link information 37 is created by the system setting block (not depicted) and contains information as follows:
  a linker name and its directory
  an output file format setting and a debug information addition as a link option
  information of a library to be linked
  link information of object files contained in the library file (specifying whch of the plurality of object files are to be linked)

A link processing block 39 uses the linker 38, the link information 37, and the library file 36 which are appropriate for a target hardware, so as to link object files 35 and carries out allocation in a memory if necessary, so as to create an execution-formatted file 40.

A composite execution-formatted file information 41 has an information for the execution-formatted file 40 to be contained in a composite execution-formatted file 43 which will be detailed later and supplies the information to a composite execution-formatted file creation block 42. This composite execution-formatted file information 41 is created by the system setting block (not depicted) and contains information as follows:
  a module name and a file name of the execution-formatted file contined in the composite execution-formatted file, and its directory
  a data on a module attribute information (which will be detailed later) to be allocated for each of the execution-formatted files (stack area size, heap area size, operation mode, operation priority, and the lie).
  an execution start address of an initialization program 78 (contained other with the number of modules in a total configuration information which will be detailed later)
  a creation date, version, and title of a composite execution-formatted file and other information (contained in the total configuration information which will be detailed later)

The composite execution-formatted file 42 is supplied with the intialization program 78 and a plurality of execution-formatted files 40 according to the information from the composite execution-formatted file. information 41, and outputs the composite execution-formatted file 43 by a processing which will be detailed later. It should be noted that the initialization program 78 is a program for executing the composite execution-formatted file 43.

Figure 6:
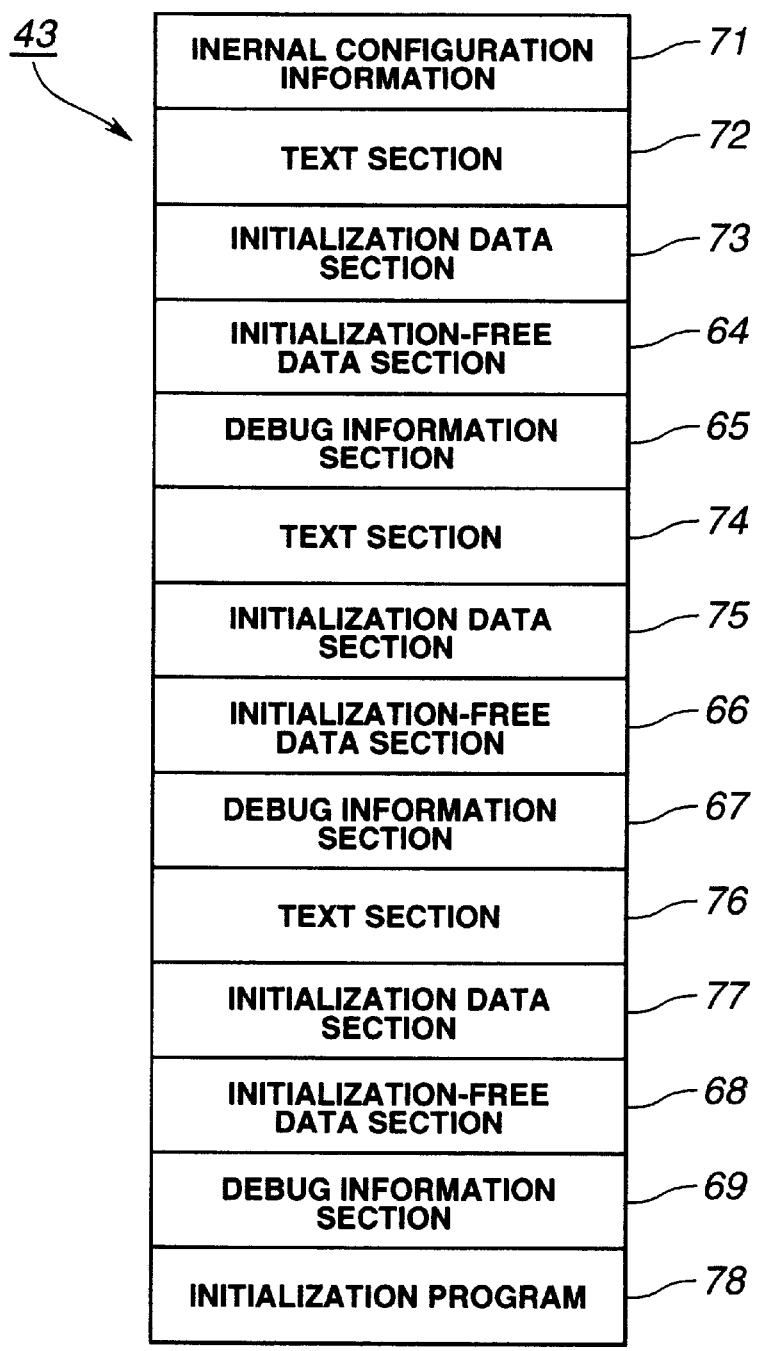
FIG. 6 explains an internal configuration of a composite execution-formatted file according to the present invention.
Figure 7:
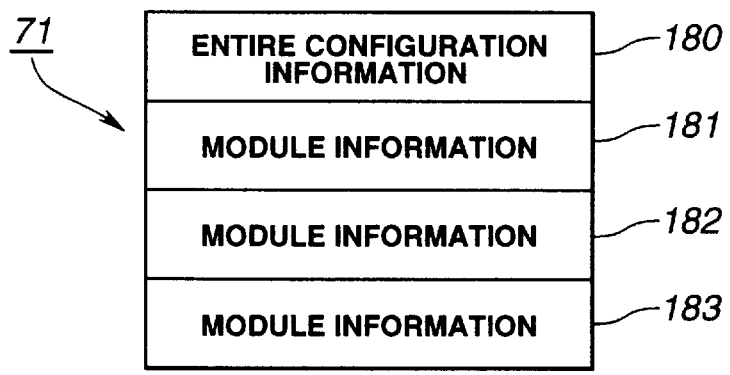
FIG. 7 explains an internal configuration information of a composite execution-formatted file.
Figure 8:
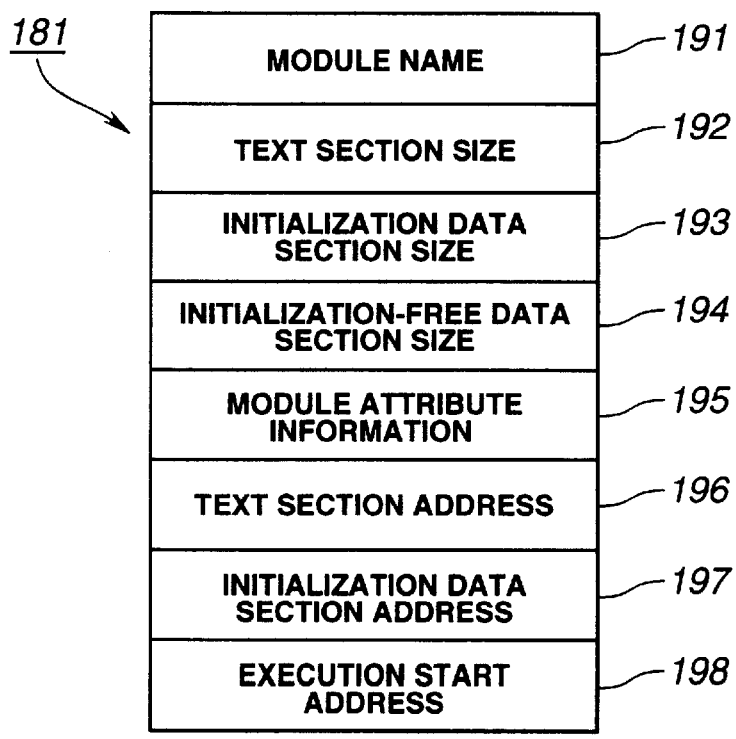
FIG. 8 explains a module information of the aforementioned internal configuration information of the composite execution-formatted file.

The composite execution-formatted file of the operating system according to the present invention has an internal configuration to be spread in a memory as shown in FIG. 6, FIG. 7, and FIG. 8 which will be detailed later.

Next, explanation will be given on a software development procedure according to the aforementioned first embodiment.

Fg. 5 shows a basic flow of the software development in the software development system shown in FIG. 4. Here, system modules are delivered mainly as the source files.

A system source file 81 and a system source file 84 are files provided with the OS function and a program to be implemented as a sour code. The system source file 81 and the system source file 84 are compiled by the compile processing block 34 to create an object file 82 and an object file 85, respectively.

The object file 82 and the object file 85 are respectively lined by the link processing block 39 to create an execution-formatted file 83 and an execution-formatted file 86, respectively.

A user source file 87 is a source file created by user for controlling an apparatus. This user source file 87 is compiled by the compile processing block 34 to create an object file 88. This object file 88 is linked by the link processing block 39 to create an execution-formatted file 89.

Corresponding to the execution-formatted files created by the link processing block 39, the composite execution-formatted file creation block 42 combines the aforementioned execution-formatted file 83, the execution-formatted file 86, and the execution-formatted file 89 to create a single composite execution-formatted file 43.

FIG. 6 shows an example of internal configuration of the aforementioned composite execution-formatted file 43.

An internal configuration information 71 is located at the head of the composite execution-formatted file 43 and contains an information for identifying a following content and its length. By analyzing this internal configuration information 71, t is possible to extract a necessary information from the following part.

A text section 72, a text section 74, and a text section 76 are program codes of the execution-formatted file 83, the execution-formatted file 86, and the execution-formatted file 89, respectively.

An initialization data section 73, an initialization data section 75, and an initialization data section 77 are initial value data of variables of the execution-formatted file 83, the execution-formatted file 86, and the execucetion-formatted file 89, respectively.

An initialization-free section 64, an initialization-free section 66, and an initialization-free section 68 are initialization-free data sections of the execution-formatted file 83, the execution-formatted file 86, and the execution-formatted file 89, respectively.

A debug information section 66, a debug information section 67, and a debug information section 69 are debug information sections of the execution-formatted file 83, the execution-formatted file 86, and the execution-formatted file 89, respectively.

An initialization program 78 is a program that, according to the internal configuration information 71, allocates the text section 72, the text section 74, and the text section 76, as well as the initialization data section 73, the initialization section 75, and the initialization data section 77 in an appropriate memory space, so as to execute one of the text section 72, the text section 74, and the text section 76. The initialization program 78 itself is a normal execution-formatted file.

It should be noted that in order to reduce the file size, it is possible to constitute a configuration without including the initialization-free data section 64, the initialization-free data section 66, and the initialization-free data section 68 as well as the debug information section 65, the debug information section 67, and the debug information section 69. This is because it is possible to create an initialization-free data section, if necessary, by an initialization-free data section size 194 contained in the module information 181 among the internal configuration information 71 which will be detailed later. As for the debug information section, there will be no problem if not necessary for debug.

When extending a program function during a program development, the source file compiled and linked as the execution-formatted file is created as a composite execution-formatted file.

When replacing some of modules during a program execution, the OS reads a new execution-formatted file into a memory and discards a memory content corresponding to a conventional function contained in the composite execution-formatted file.

Here, the aforementioned internal configuration information 71 will be detailed. It should be noted that the explanation given below assumes a case of a composite execution-formatted file containing three execution-formatted files, i.e., the execution-formatted file 83, the execution-formatted file 86, and the execution-formatted file 89 as in the composite execution-formatted file 43 shown in FIG. 6.

FIG. 7 shows a configuration of the internal configuration information 71.

A total configuration information 180 is the total number of modules (execution-formatted files) contained in the internal configuration information 71. In this case, the total number of modules is 3. A module information 181, a module information 182, and a module information 183 respectively correspond to the execution-formatted file 83, the execution-formatted file 86, and the execution-formatted file 89. That is, the module information 181 contains an information concerning the text section 72 and the initialization data section 73; the module information 182 contains an information concerning the text section 74 and the initialization data section 75; and the module information 183 contains an information concerning the text section 76 and the initialization data section 77.

FIG. 8 shows an internal configuration of the module information 181 of the aforementioned internal configuration information 71. It should be noted that the module information 182 and the module information 183 also have an identical internal configuration.

In FIG. 8, a module name 191 is a name of a module contained in the execution-formatted file 83 and is used for identification of the module.

A text section size 192 indicates the size of the text section 72.

An initialization section size 193 indicates the size of the initialization section 73.

An initialization-free data section size 194 indicates the size of the initialization-free data section 64. When the composite execution-formatted file is read in during an execution, a memory indicated by this initialization-free data section size 194 is allocated for the initialization-free data section.

A module attribute information 195 is an attribute information required during execution of the module such as a necessary stacker size and heap size.

A text section address 196 is an address of a memory space where the text section 72 is to be placed. This address is required when the text section 72 is linked in advance so as to be placed at a particular address.

An initialization data section address 197 is an address in a memory space where the initialization data section 73 is to be placed. This address is required when the initialization data section 73 is linked in advance so as to be placed at a particular address.

An execution start address 198 is a first address to be called by the text section 72. After a processing at this address is started, the module of the execution file 83 stored in the text section 72 starts operation.

The size of the internal configuration information 71 can be calculated from the total configuration information 180 and sizes of the module information 181, the module information 182, and the module information 183. Accordingly, the text section 172 needs only to read the size of the text section size 192 at a distance of the size of the internal configuration information 71 from the head of the composite execution-formatted file 43.

Similarly, the initialization data section size 193 needs only to read the size of the initialization data section size 193 at a total distance of the size of the internal configuration information 71 and the text section size 192 from the head of he composite execution-formatted file 43. The same applies to the text section 74 and after.

Figure 9:
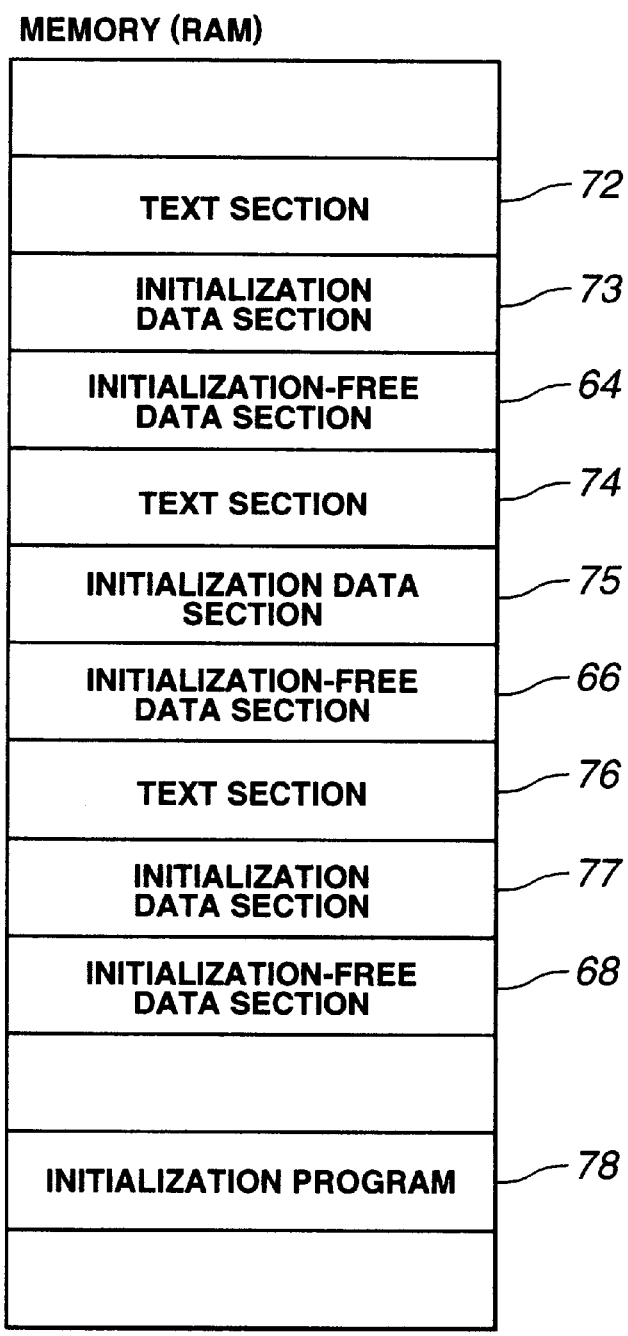
FIG. 9 explains a state of the composite execution-formatted file spread in a memory.

FIG. 9 shows a case when the composite execution-formatted file 43 shown in FIG. 6 is entirely read in a RAM (random access memory, enabled memory for reading and writing).

Firstly, the initialization program 78 is started by an ordinary program start processing block (not depicted) and allocated in a memory to be executed.

Next, the initialization program 78 reads the composite execution-formatted file 43 recorded in a ROM (read only memory, memory dedicated for reading out) (not depicted), analyzes its internal configuration information 71, and allocates the respective sections in the composite execution-formatted file 43 in a memory (RAM) as shown in FIG. 9.

If the composite execution-formatted file 43 has no substances of the initialization-free data section 64, the initialization-free data section 66, and the initialization-free data section 68 allocated, and has only their sizes recorded in the internal configuration information 71, then the initialization program 78 allocates in the memory the initialization-free data section 64, the initialization-free data section 66, and the initialization-free data section 68.

Finally, the initialization program 78 passes control to one of the text section 72, the text section 74, and the text section 76, thus terminating the execution.

For example, if control is passed to the text section 72, and the text section 72 has a function of memory management, and the initialization data section 73 has an address information of the respective data sections, then it is possible to release the memory occupied by the initialization program 78 for other use.

Moreover, if any of the text section 76, the initialization data section 77, and the initialization-free data section 68 becomes unnecessary during an execution, the program of the text section 76 can report a memory release to the program of the text section 72, so that a memory area of these unnecessary sections is released so as to be available for other program.

If the composite execution-formatted file contains debug information sections corresponding to a debug information section which will be detailed later, then they are not read into a memory but referenced from a debugger.

Figure 10:
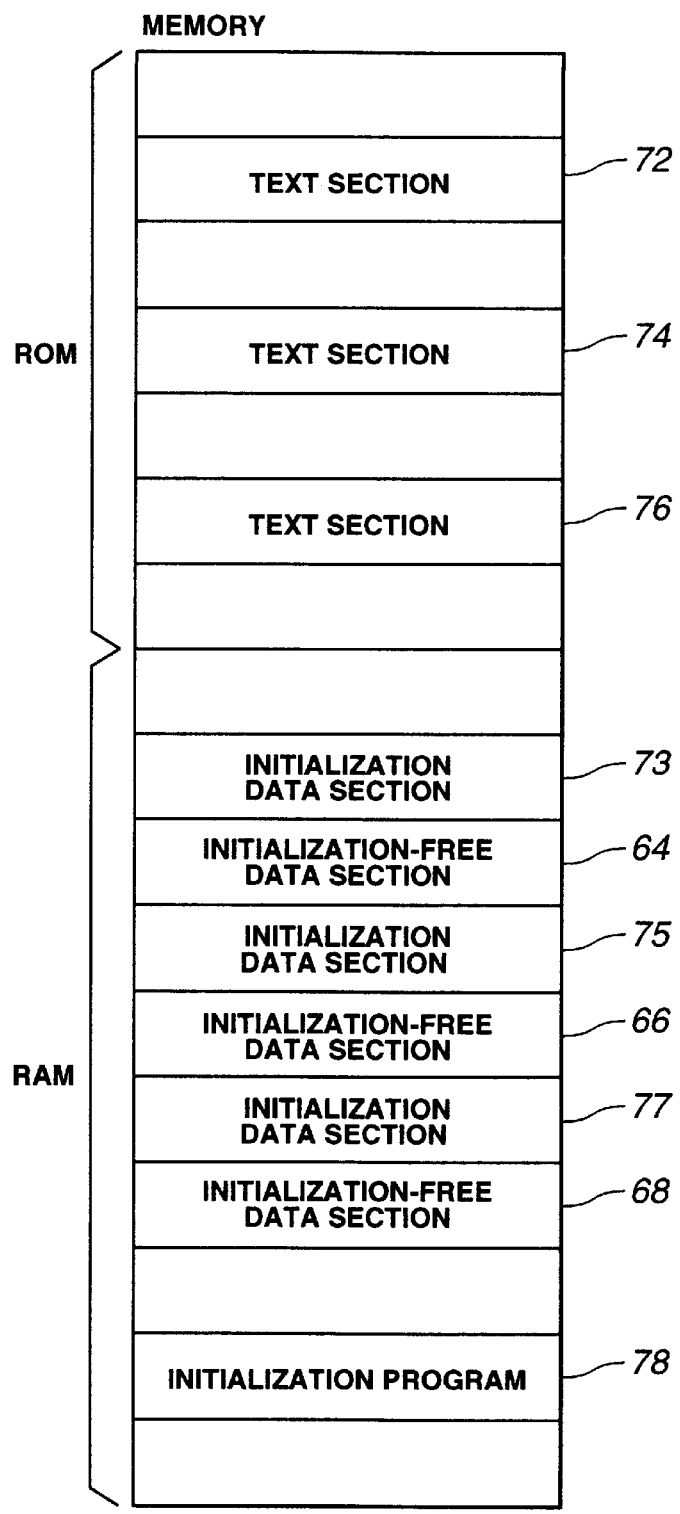
FIG. 10 explains a state of the composite execution-formatted file spread in a memory.

FIG. 10 shows a memory arrangement when only the data sections of the composite execution-formatted file 43 of FIG. 6 are read into a RAM, whereas its text sections are referenced directly from a ROM.

That is, the text section 72, the text section 74, and the text section 76 are recorded in the ROM, whereas the initialization data section 73, the initialization data section 75, and the initialization data section 77, as well as the initialization-free data section 64, the initialization-free data section 66, and the initialization-free data section 68 are allocated in the RAM.

It should be noted that in the same way as in FIG. 9, the initialization data section 73, the initialization data section 75, and the initialization data section 77, as well as the initialization-free data section 64, the initialization-free data section 66, and the initialization-free data section 68 are also recorded in the ROM firstly, and they are copied by the initialization program 78 into the RAM. In this case also, similarly as in FIG. 9, it is possible to delete for reuse those sections which have become unnecessary.

Figure 5:
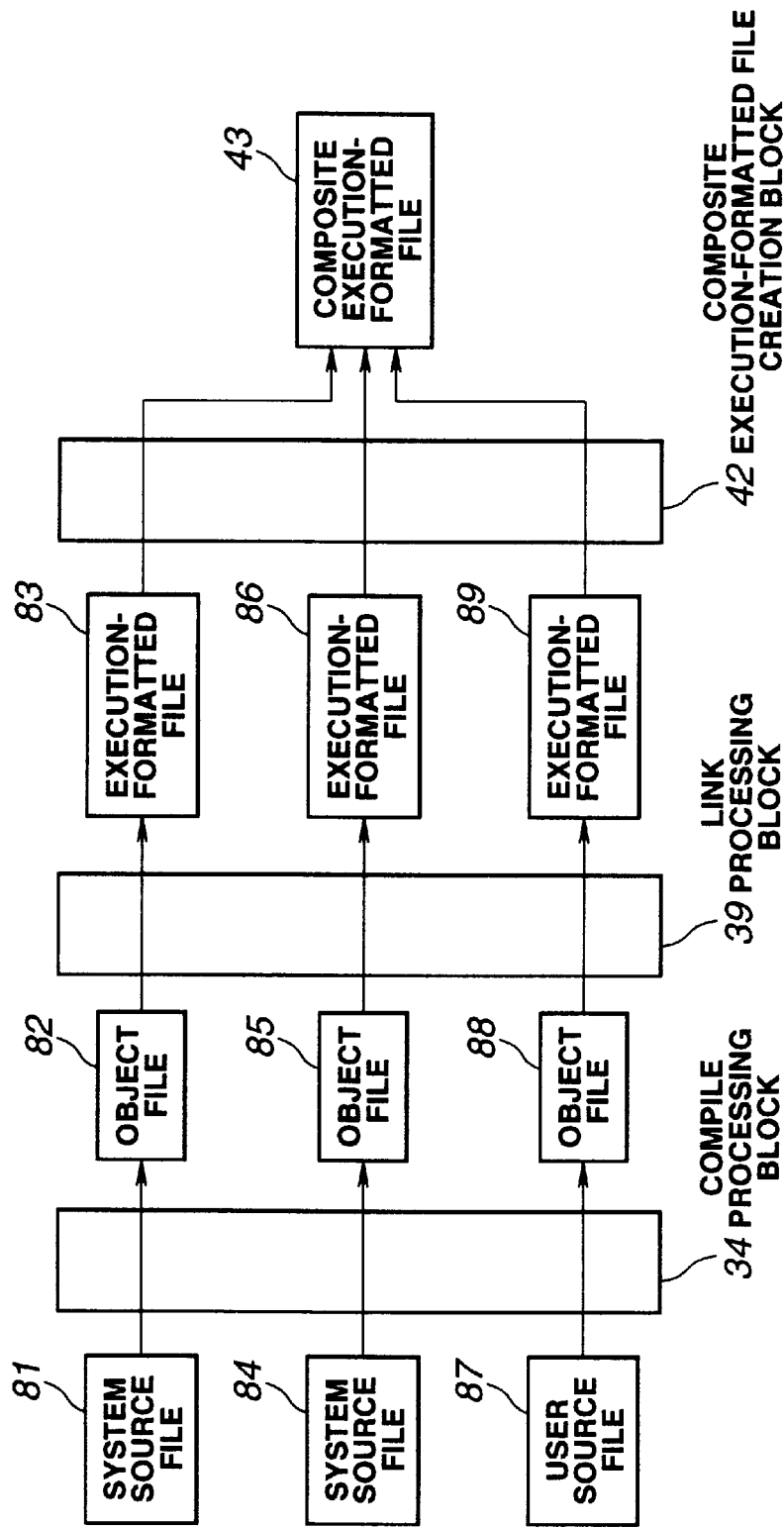
FIG. 5 is a block diagram showing an example of software development procedure in the aforementioned software development system.

Next, explanation will be given on the composite execution-formatted file creation block 42 of FIG. 5.

Figure 11:
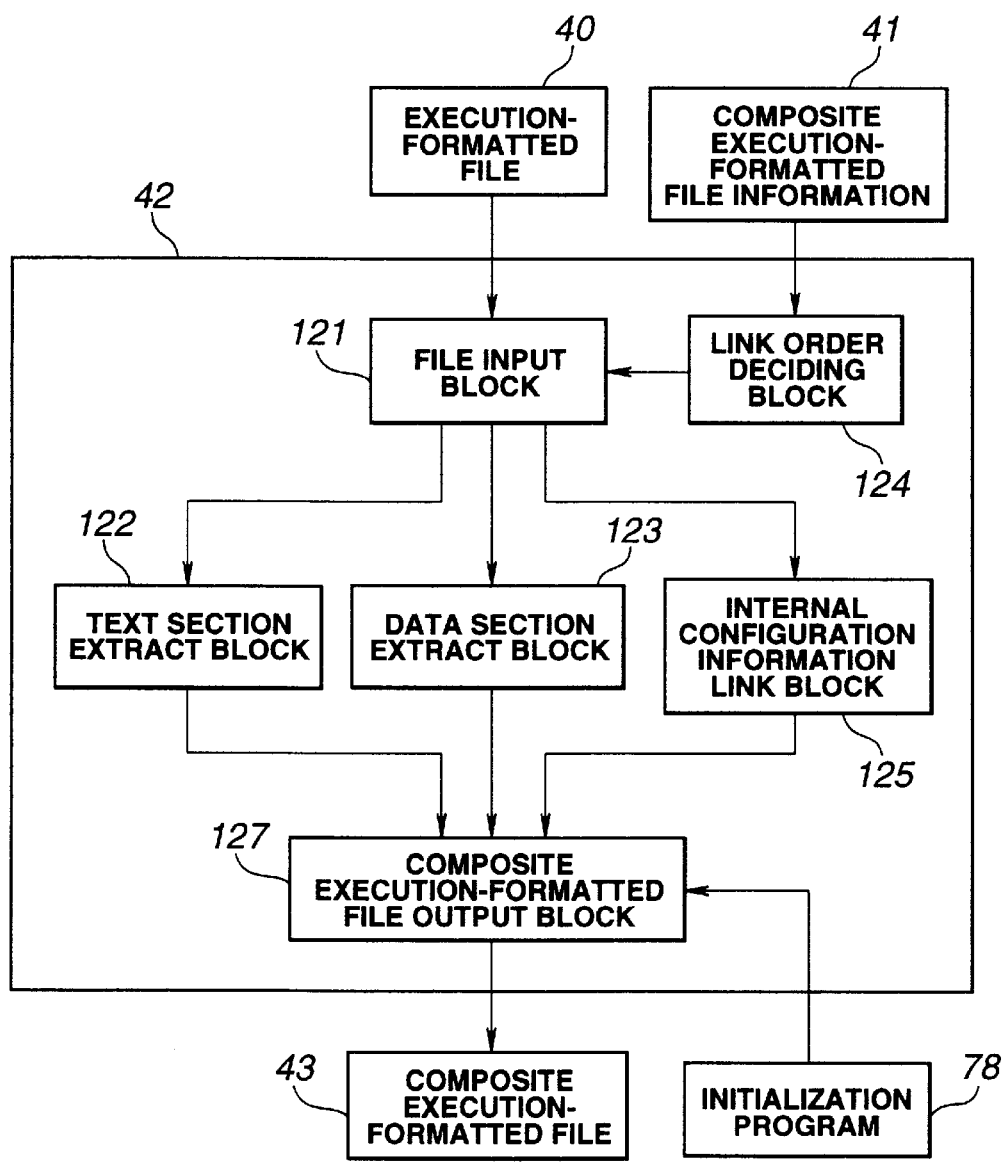
FIG. 11 is a block diagram showing a configuration example of a composite execution-formatted file creation block of the software development system according to the first embodiment of the present invention.

FIG. 11 shows a configuration example of the composite execution-formatted file creation block 42.

A link priority deciding block 124 fetches a list of execution-formatted files from the composite execution-formatted file information 41 and decides their link priority.

Figure 1:
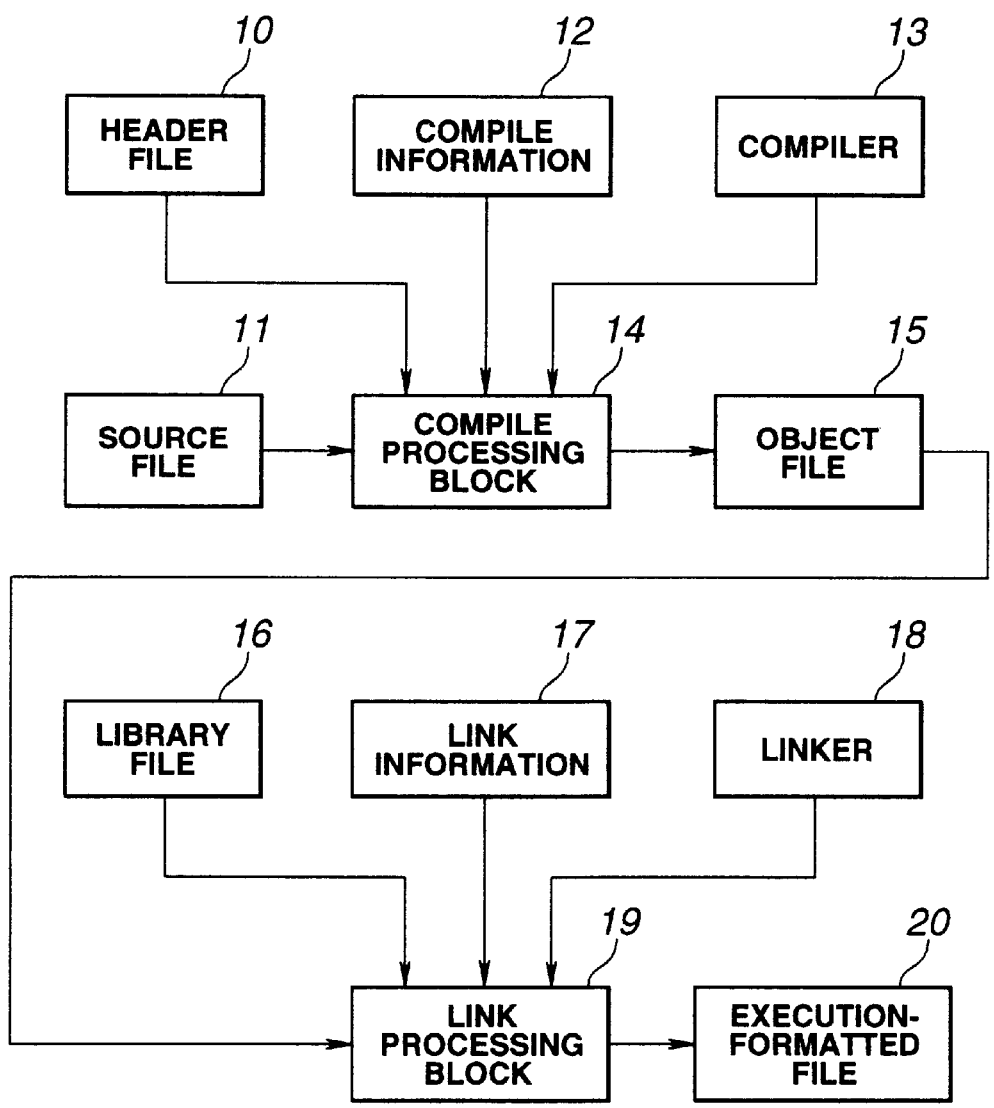
FIG. 1 is a block diagram showing a configuration of a software development system in an ordinary built-in OS.
Figure 2:
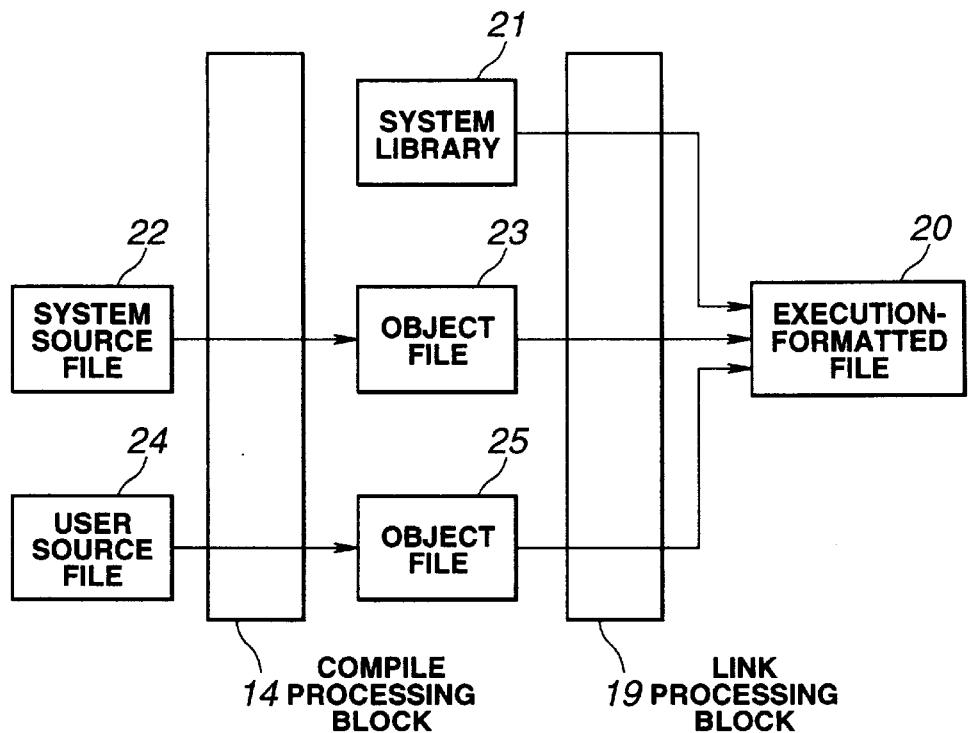
FIG. 2 is a block diagram showing a software development procedure in an ordinary built-in OS.
Figure 3:
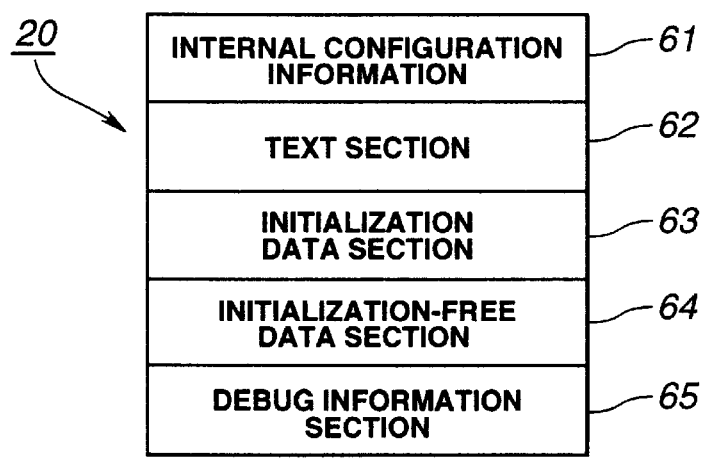
FIG. 3 shows an example of internal configuration of a conventional execution-formatted file.

A file input block 121 reads in an execution-formatted file 40 according to the link priority decided by the link priority deciding block 124. This execution-formatted file 40 has a configuration identical to that of the conventional execution-formatted file 20 shown in FIG. 3. In the explanation below, the same reference symbols as the respective sections of the execution-formatted file 20 will be used.

A text section extract block 122 receives an execution-formatted file from the file input block 121, analyzes its internal configuration information 61, and fetches a text section 62.

A data section extract block 123 receives the execution-formatted file 40 from the file input block 121, analyzes its internal configuration information 61, and fetches an initialization data section 63.

An internal configuration information link block 125 extracts from the internal configuration information 61 of the respective execution-formatted files an information concerning the text section 62 and the initialization data section 63, and links them according to an input order from the file input block 121, so as to create an internal configuration information 71 which is a header information.

A composite execution-formatted file output block 127 links the text section 62 from the text section extract block 122 and the initialization data section 63 from the data section extract block 123 according to the input order from the text section extract block 122 and the data section extract block 123, so as to create a text section 72, a text section 74, a text section 76, an initialization data section 73, an initialization data section 75, and an initialization data section 77. Moreover, the composite execution-formatted file output block 127 reads in the internal configuration information 71, the text section 72, the text section 74, the text section 77, and the initialization program 78 for output as a single composite execution-formatted file 43.

Figure 12:
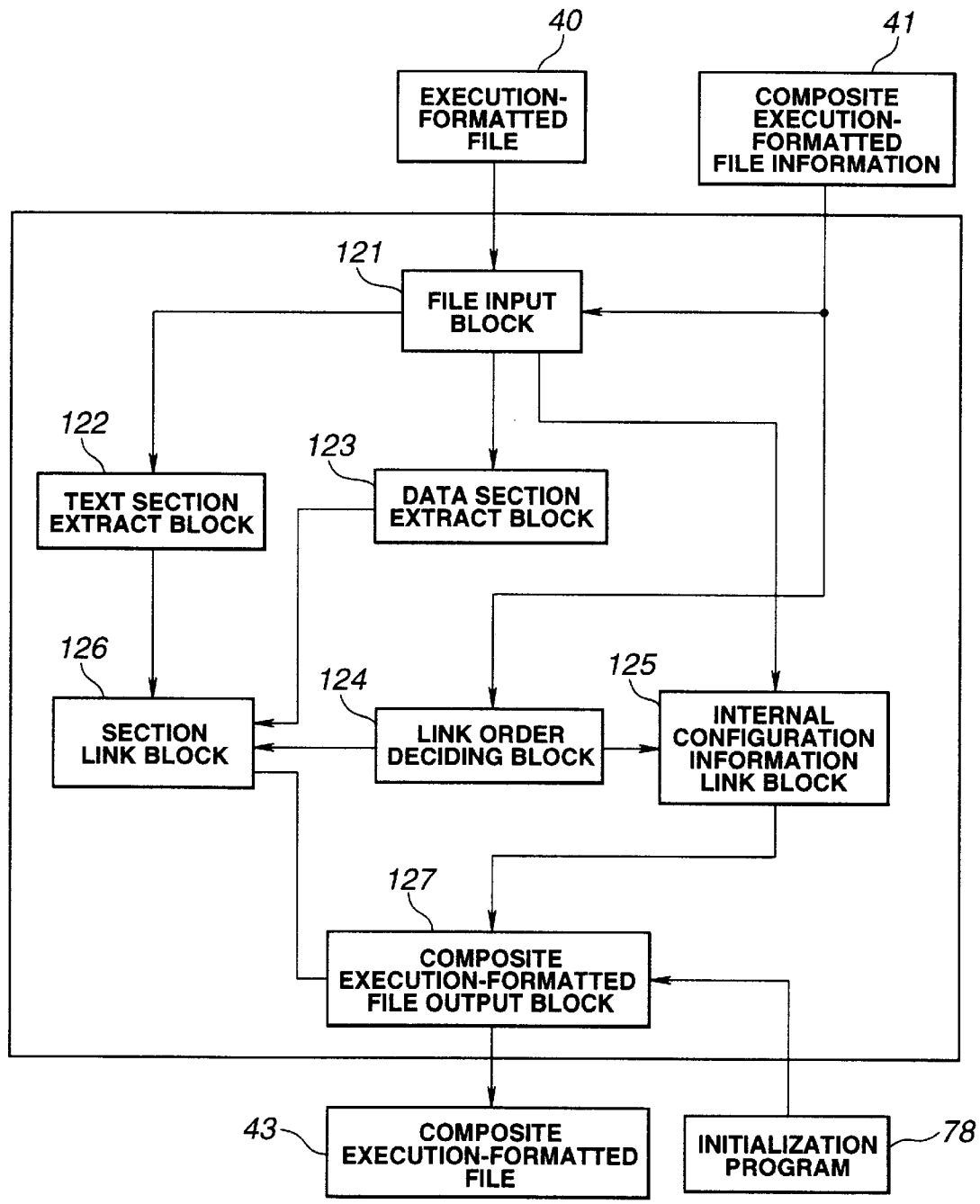
FIG. 12 is a block diagram showing another configuration example of the composite execution-formatted file creation block of the software development system.

FIG. 12 shows another configuration example of the composite execution-formatted file creation block 42.

The file input block 121 reads in the execution-formatted file 40 according to the composite execution-formatted file information 41.

The text section extract block 122 receives the execution-formatted file 40 from the file input block 121, analyzes its internal configuration information 61, and fetches the text section 62.

The data section extract block 123 receives the execution-formatted file 40 from the file input block 121, analyzes its internal configuration information 61, and fetches the initialization data section 63.

The link priority deciding block 124 fetches a list of execution-formatted files from the composite execution-formatted file information 41 and decides their link priority.

The internal configuration information link block 125 extracts from the internal configuration information 61 of the respective execution-formatted files an information concerning the text section 62 and the initialization data section 63, and links them according to the link priority (order) deciding block 124, so as to create an internal configuration information 71.

The section link block 126 links the text section 62 from the text section extract block 122 and the initialization data section 63 from the data section extract block 123 according to the link order from the link priority deciding block 124, so as to create a text section 72, a text section 74, a text section 76, an initialization data section 73, an initialization data section 75, and an initialization data section 77. Moreover, the composite execution-formatted file output block 127 reads in the internal configuration information 71, the text section 72, the ext section 74, the text section 76, the initialization data section 73, the initialization data section 75, the initialization data section 77, and the initialization program 78 for output as a single composite execution-formatted file 43.

It should be noted that in the configuration of FIG. 11, the function of the aforementioned section link block is included in the composite execution-formatted file output block 127.

In the aforementioned first embodiment, the execution-formatted file 83, the execution-formatted file 86, the execution-formatted file 89 are combined into a single composite execution-formatted file 43. Thus, a program can be executed by reading in only one file.

For example, When replacement of the execution-formatted file 83 is wished during an execution, this can be carried out by discarding the text section 72 and the initialization data section 73 which has been allocated in a memory space. Thus, during an execution of a composite execution-formatted file 43, it is possible to replace some of the modules.

Moreover, the composite execution-formatted file 43 does not contain the initialization-free data section 64 and the debut information section 65. Accordingly, the file size can be minimized, requiring a minimum memory size in the ROM.

When adding a system module, the system module need not be linked as a library to an execution-formatted file but the execution-formatted file is only added to the composite execution-formatted file 43. Moreover, when any of the execution-formatted file 83, the execution file 86, and the execution file 89 in the composite execution-formatted file 43 has become unnecessary, it is possible to delete only those files which have become unnecessary.

Furthermore, there is provided a merit that it is possible to implement a plurality of modules without any file system.

[2] Second Embodiment

Next, explanation will be given on a software development system according to a second embodiment of the present invention. In the explanation given below, like components as in the first embodiment will be denoted with like reference symbols.

Figure 13:
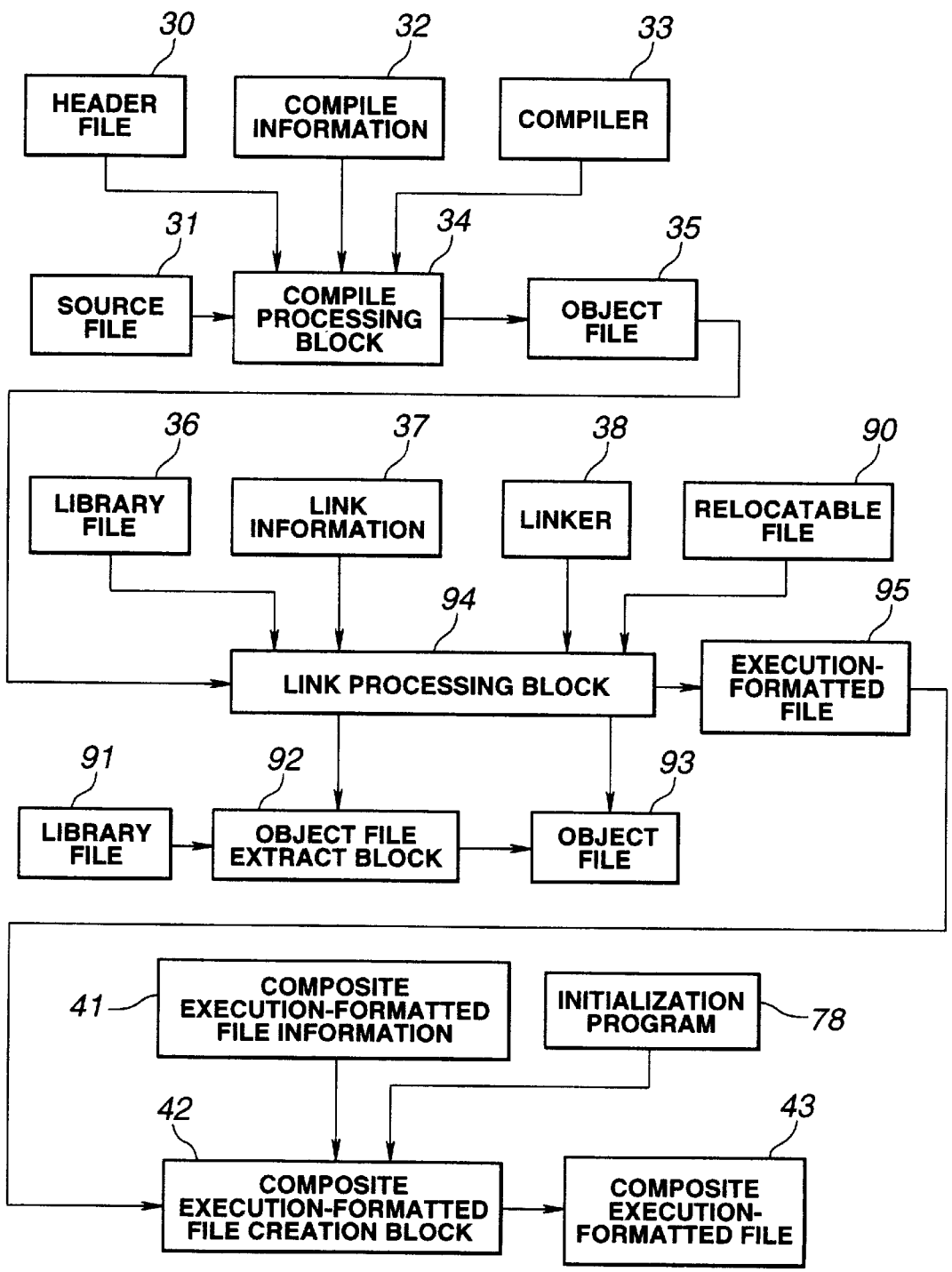
FIG. 13 is a block diagram showing a configuration example of a software development system according to a second embodiment of the present invention.

FIG. 13 shows an example of the software development procedure in the software development system as the second embodiment of the present invention.

A relocatable file 90 has an internal configuration almost identical as an execution-formatted file 90 but differs from it that the relocatable file 90 can be relocated in a memory and can be allocated from there into a particular memory space.

The execution-formatted file 95 either has been allocated at a fixed position in a memory or enabled to be allocated at any position in a memory. The execution-formatted file 95 either cannot change this feature or can be relocated but requires a useless program size compared to a case of feature change from a relocatable file 90.

A link processing block 94 includes the function of the link processing block 39 shown in the configuration of FIG. 4 and further links the relocatable file 90 to other object file 35 or he like and allocates it in an appropriate area in a memory, if necessary, for output as the execution-formatted file 95.

An object file extract block 92 fetches an object file 93 from a library file 91 containing a system object file and passes it to the link processing block 94.

Moreover, the link processing block 94 creates an execution-formatted file 95 directly from a plurality of object files 93. This link processing block 94 and the object file extract block 92 constitute relocatable file creation means.

Next, explanation will be given on the software development procedure in the second embodiment of the present invention.

As has been explained in the first embodiment, the library file 36 of FIG. 13 is a system library or a user library or a library belonging to a linker 38. The linker 38 extracts an object file referenced from the object file 35 or the relocatable file 90 and links it to the object file 35.

A library file 91 is a system library for linking objects files 93 contained in the library file 91 without reference relationship from other file, so as to create an execution-formatted file 95. That is, the library file 91 can create an execution-formatted file 95 only from the library file 91 without the source file 31, the object file 35, or the relocatale file 90.

Figure 14:
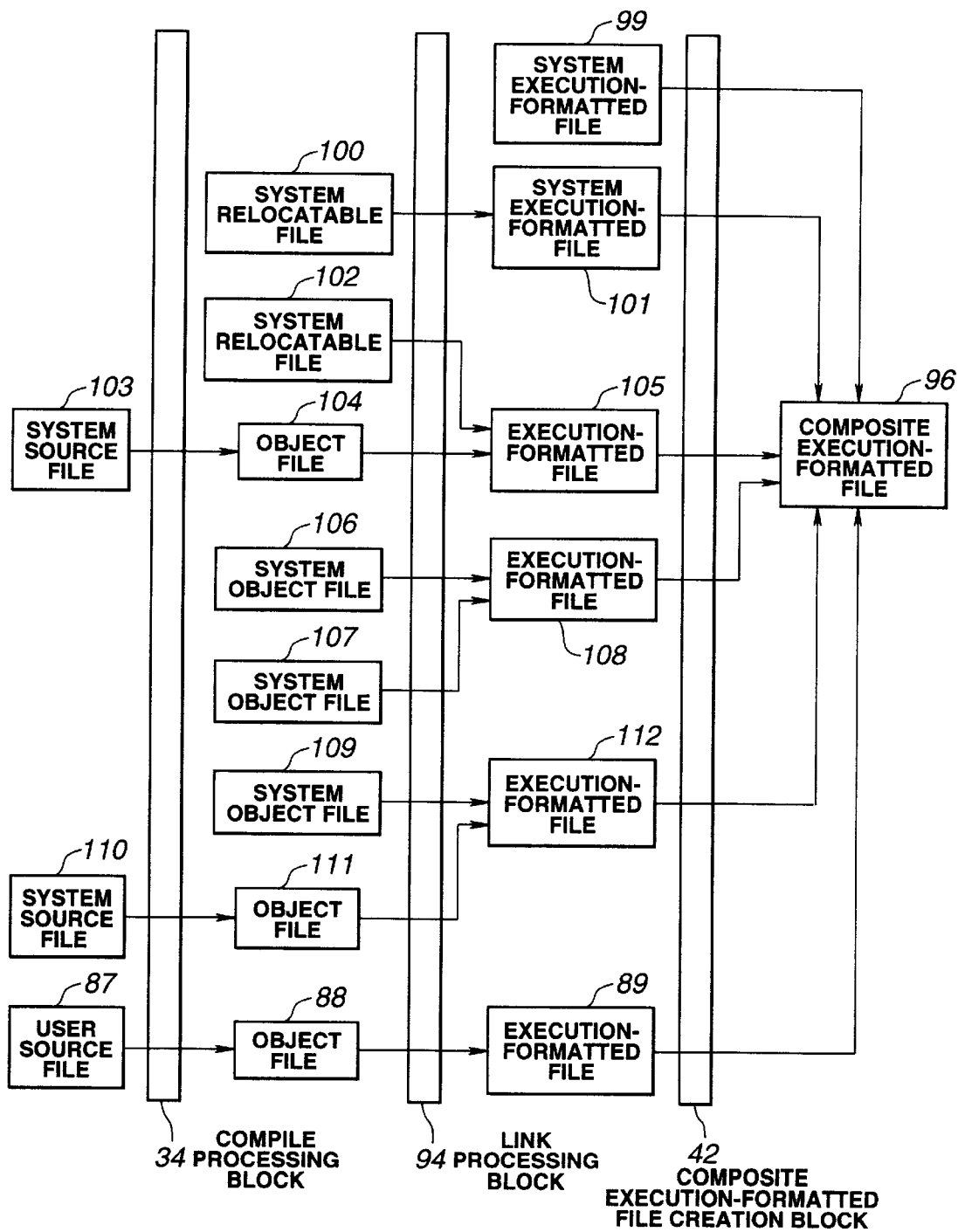
FIG. 14 is a block diagram showing an example of software development procedure in the aforementioned software development system.
Figure 15:
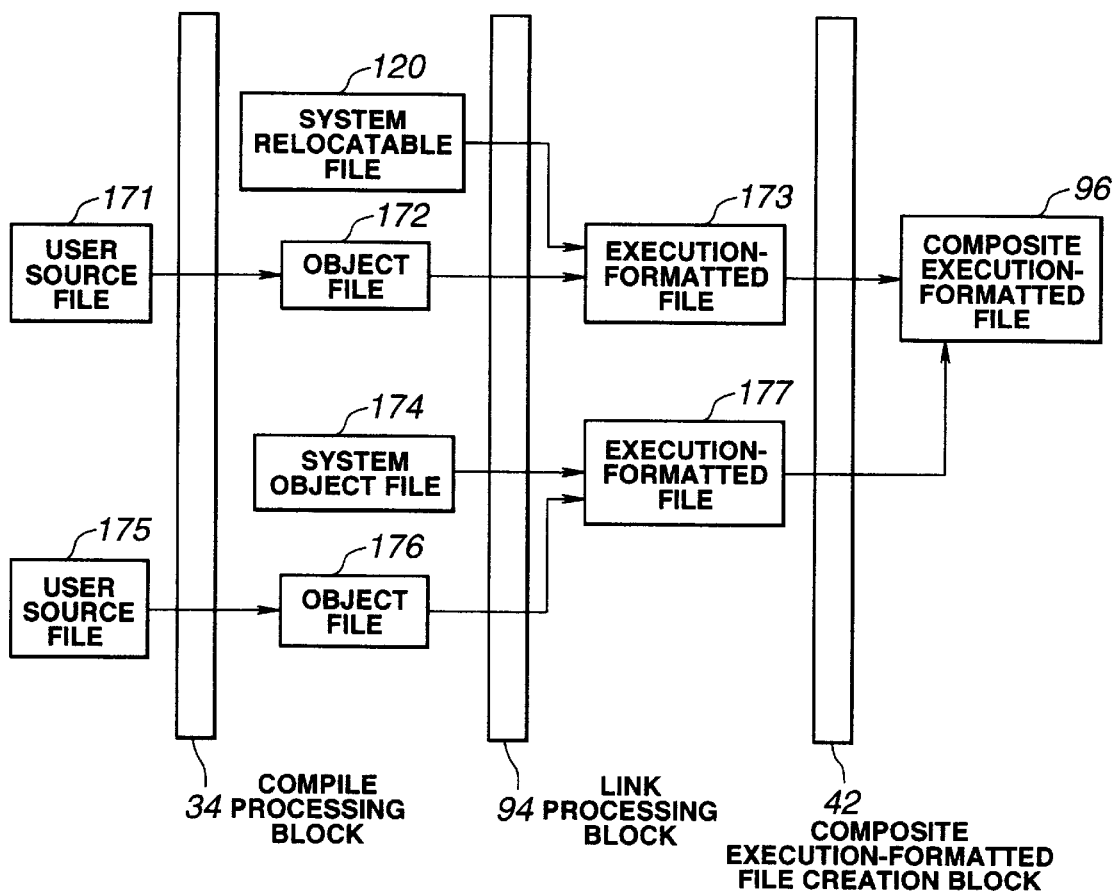
FIG. 15 is a continuation of the block diagram of FIG. 14 showing an example of software development procedure in the aforementioned software development system.

FIG. 14 and FIG. 15 show an example of software development procedure according to the second embodiment of the present invention. The system module is delivered mainly as an execution-formatted file or a relocatable file.

Here, a system object file 106 and a system object file 107 are the aforementioned system modules.

It should be noted that the object file extract block 92 in FIG. 13 fetches from the link processing block 94 which has read in the link information 37, the information which file is to be extracted from the library file 91.

A system execution-formatted file 99 can carry out an operation valid as as a system module by itself and can be embedded by the composite execution-formatted file creation block 42 directly in the composite execution-formatted file 96.

Similarly, a system relocatable file 100 also can carry out an operation valid as a system module by itself, and after converted by the link processing block 94 into a system execution-formatted file 101, can be embedded by the composite execution-formatted file creation block 42 directly into the composite execution-formatted file 96.

A system relocatable file 102 need to be linked to a system source file 103 so as to operate as a system module.

The system source file 103 is compiled by the compile processing block 34 into an object file 104 and further linked to the system relocatable file 102 in the link processing block into the execution-formatted file 105.

A system object file 106 and a system object file 107 are linked to each other in the link processing block 94 into an execution-formatted file 018.

A system object file 109 is linked to an object file 111, i.e., a system source file 110 compiled, into an execution-formatted file 112.

Moreover, a user source file 171 is compiled by the compile processing block 34 into an object file 172, which is further linked to the system relocatable file 120 in the link processing block 94 so as to become an execution-formatted file 173.

A user source file 175 is compiled by the compile processing block 34 into an object file 176, which is further linked to a system object file 174 in the link processing block 94, so as to become an execution-formatted file 177.

Thus, a user can set some information for the system relocatable file 120 or the system object file 174.

The composite execution-formatted file creation block 42 creates a composite execution-formatted file 96 from the system execution-formatted file 99, the system execution-formatted file 101, the execution-formatted file 015, the execution-formatted file 106, the execution-formatted file 112, the execution-formatted file 89, the execution-formatted file 173, and the execution-formatted file 177.

In this second embodiment, by delivering system modules as the system execution-formatted file 99, the relocatable file 100, and the relocatable file 102, it is possible to reduce the time required for compile by the user side. Moreover, it is also possible to reduce the compile time at the user side by delivering the system object file 106, the system object file 107, and the system object file 109 from the library file 91 (not depicted).

[3] Third Embodiment

Next, explanation will be given on a software development system according to a third embodiment of the present invention.

Figure 16:
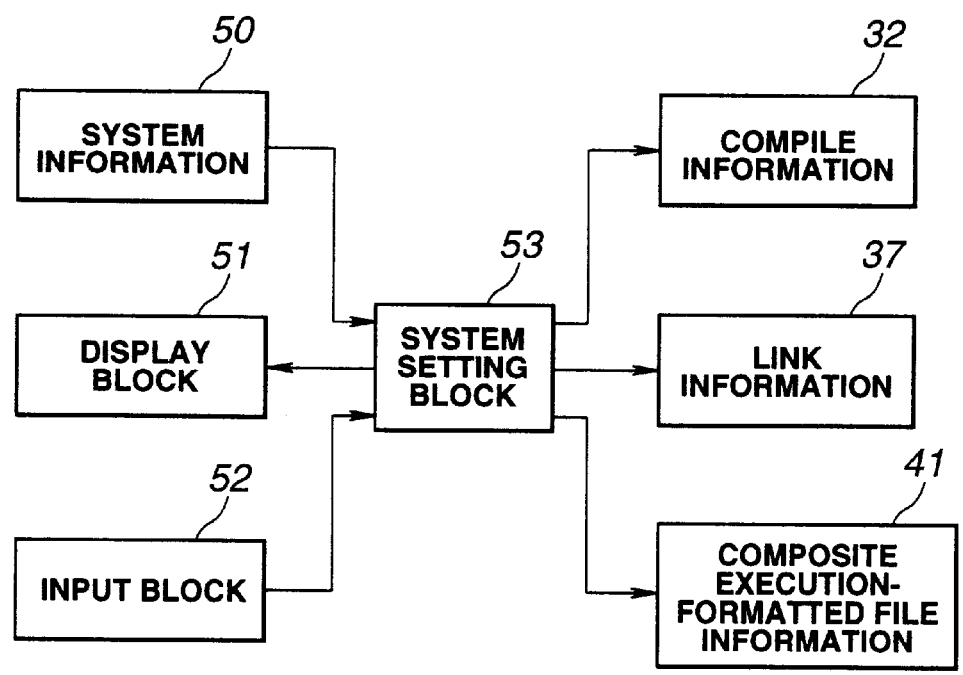
FIG. 16 is a block diagram showing a configuration example of a software development system according to a third embodiment of the present invention.

FIG. 16 shows an example of software development procedure according to the third embodiment of the present invention.

The third embodiment uses an entire system configuration identical to that of the first and the second embodiment. However, in the third embodiment, the compile information 32, the link information 37, and the composite execution-formatted file 41 are not fixed but can be modified by the user.

A system information 50 retains software information about a target hardware, compiler, linker, and the like which can be used in this software development system.

A display block 51 is a display apparatus for interactive system setting by the user. For example, the display block 51 is a display apparatus of a computer for software development.

An input block 52 is an apparatus through which the user enters answer to the content displayed on the display block 51. For example, the input block 52 is a keyboard and mouse of the computer for software development.

A system setting block 53 reads in the system information 50 and according to the system information 50, outputs an information about the software development system to the display block 51, and receives a selection result from the input block 52. Moreover, the system setting block 52, according to the system information 50 and an input result from the input block 52, outputs a compile information, link information, and a composite execution-formatted file information.

Next, explanation will be given on a system setting procedure according to the third embodiment.

Figure 17:
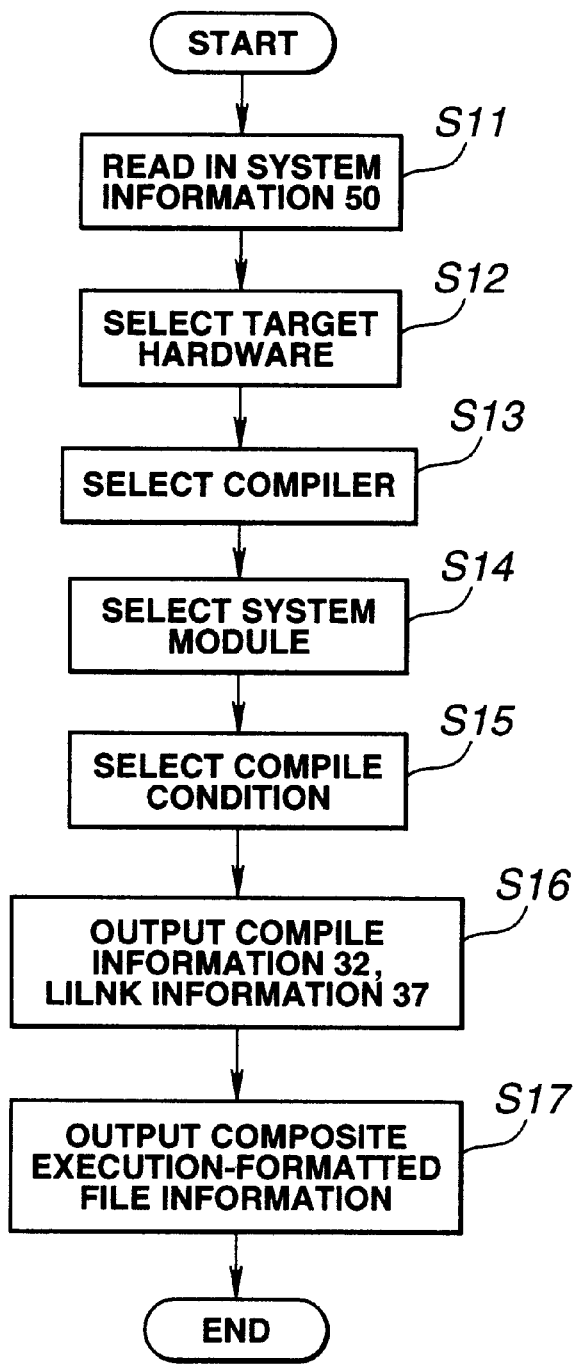
FIG. 17 is a flowchart showing a basic procedure in the aforementioned software development system.

FIG. 17 shows an example of software development procedure according to the third embodiment of the present invention.

Firstly, in step S11, the system setting block 53 reads in the system information 50.

Next, in step S12, the system setting block 53 references from the system information 50 a list of target hardware supported. If a plurality of hardware apparatuses are listed up, the display block 51 displays target hardware selections and the user selects a target through the input block 52.

Figure 18:
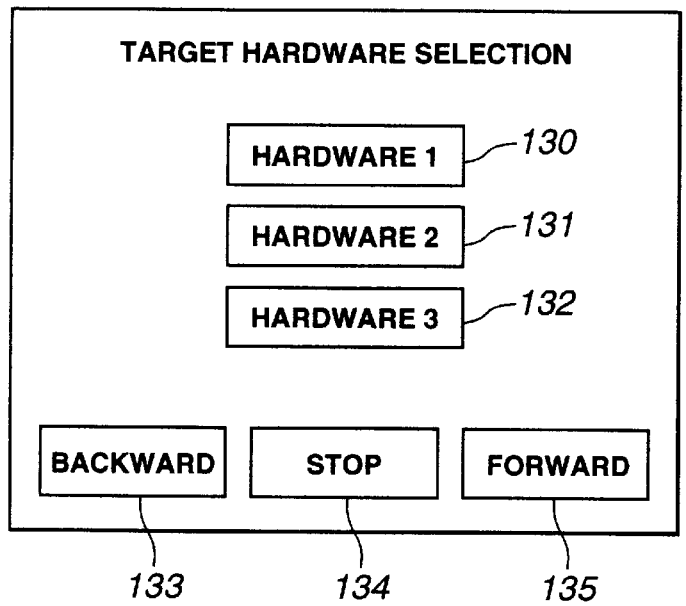
FIG. 18 shows a display example of a display block of the aforementioned software development system.

FIG. 18 shows an example of target hardware selections displayed on the display block 51 in step S12. The user selects through the input block 52 such as a mouse a button 130, a button 131, or a button 132 corresponding to a desired target hardware and depresses the button 135 to enter the selected target hardware. The button 133 is depressed to return to a setting immediately before, and the button 134 is depressed to terminate the system setting.

Next, in step S13, the system setting block 53 references from the system information 50 a list of compilers supported by this software development system. If a plurality of compilers are listed up, the display block 51 displays compiler selections. The user selects a desired compiler through the input block 52.

Next, in step S14, the system setting block 53 references from the system information 50 a list of system modules and causes the display block 51 to display system module selections which can be selected by the user. The user selects a desired system module through the input block 52.

Figure 19:
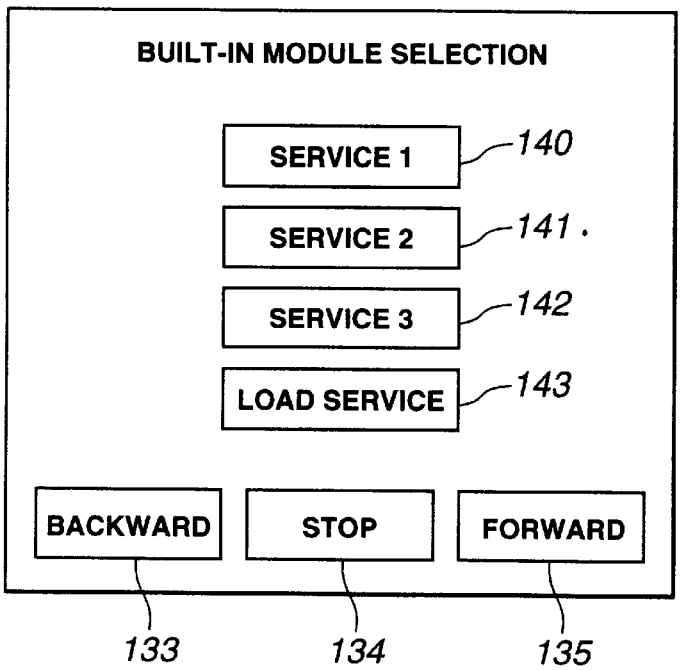
FIG. 19 shows another display example of the display block of the aforementioned software development system.

FIG. 19 shows an example of built-in module selections displayed on the display block 51 in step S14. The user selects any of the buttons 140, button 141, and button 142 corresponding to desired service(s) and depresses the button 135 to enter the selected service(s). When the button 140, button 141, and button 142 are selected, modules necessary for providing the service(s) are selected. Moreover, for the button 140, button 141, and button 142, user modules can also be assigned together with system modules. By selecting the button 143, a user-developed module can be loaded.

Next, in step S15, a compile condition is selected in the compiler selected in step S13.

Figure 20:
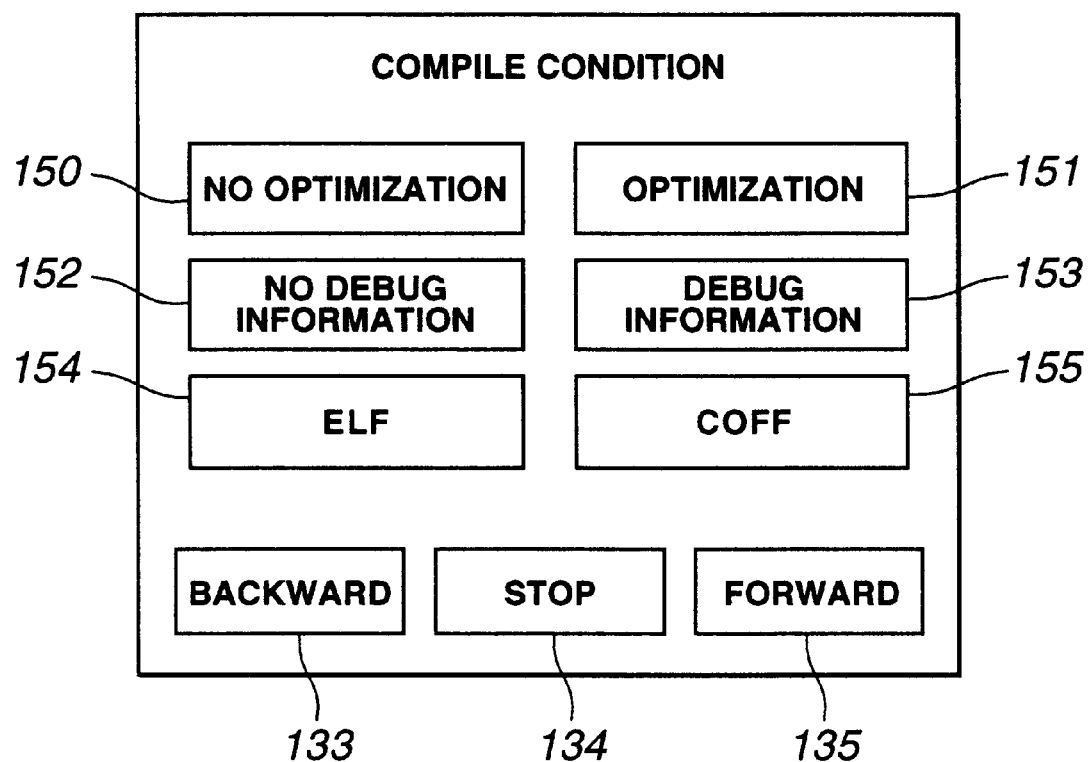
FIG. 20 shows still another display example of the display block of the aforementioned software development system.

FIG. 20 shows an example of compile condition selections displayed on the display block 51 in step S15. The user select one of the button 150 and the button 151 depending on optimization requirement; one of the button 152 and the button 153 depending on the debug information involved; one of the button 154 and the button 155 according to the output file format; and depress the button 135 to enter the selected compile conditions.

Next, in step S16, the system setting block 53, according to the user selection results in steps S12 to S15, outputs a compile information 32 and a link information 37.

Subsequently, in step S17, the system setting block 53, according to the user selection result in step S14, outputs a composite execution-formatted file 41.

Thus, the system setting procedure is complete, which is followed by the procedure shown in FIG. 4 and FIG. 13 in the software development system.

The aforementioned compile information 32 is used to specify a compile format for the compiler 33 in the compile processing block 34; and the aforementioned link information 37 is used to specify a link format for the linker 38 in the link processing block 94. Moreover, the composite execution-formatted file information 41 is referenced as an information for the execution-formatted file 40 to be included in the composite execution-formatted file 43.

In this third embodiment, it is possible to select a module according to a user's desire from a plurality of system execution-formatted files, thus enabling to constitute a program using the desired execution-formatted file.

[4] Other Embodiments

Note that the present invention is not to be limited to the aforementioned embodiments and can be embodiment in various modifications.

For example, in the software development procedure in the software development system shown in FIG. 13 as the second embodiment of the present invention, when the link processing block 94 links one or more than one object filles 35, one or more than one library files 36, one or more than one relocatable files 90, and one or more than object files 93 and outputs an execution-formatted file allocated at a certain address according to an address information from the link information, it is also possible to create a relocatable file as an intermediate file.

Figure 21:
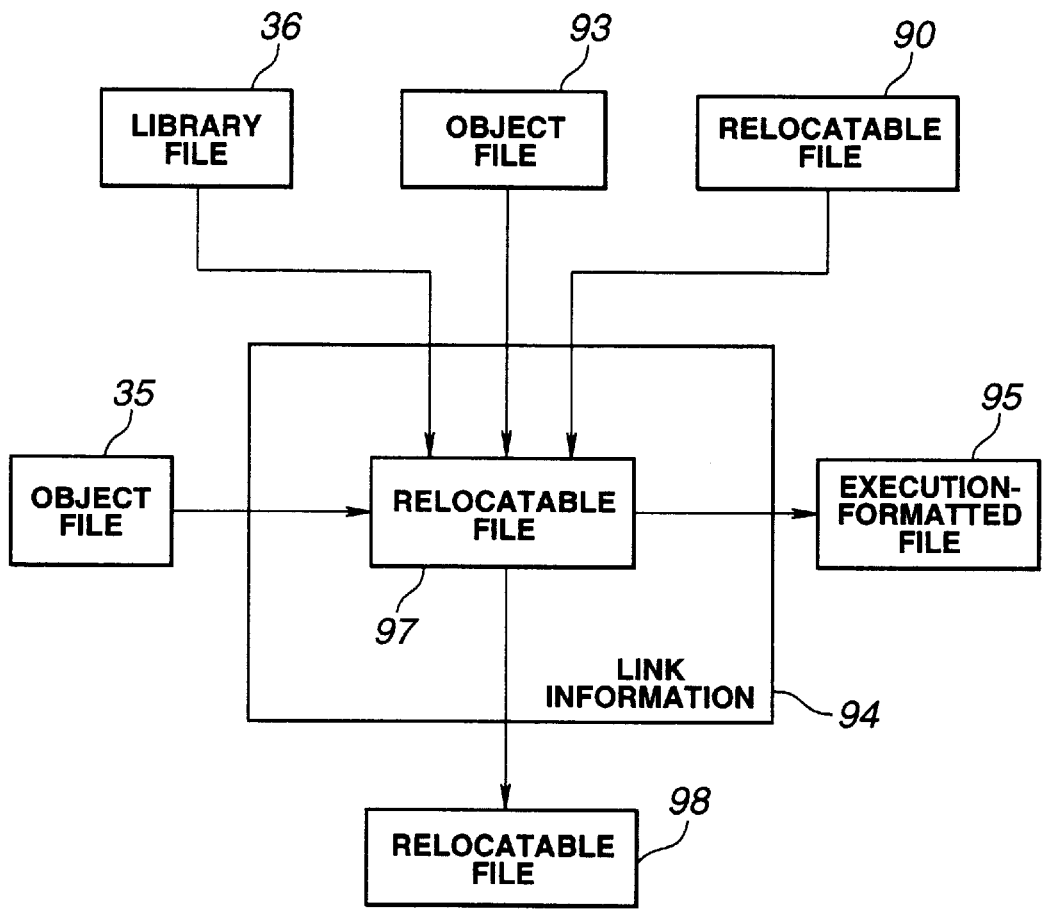
FIG. 21 explains a specific example of relocatable file creation means.

FIG. 21 shows an example of such relocatable file creation means.

That is, relocatable file 97 is a file created as an intermediate file for outputting an execution-formatted file 95 from the object file 35, the library file 36, and the relocatable file 90. The relocatable file 97 is deleted at the final stage. A relocatable file 98 has a content identical to that of the relocatable file 97 but outputted so as to be preserved for reuse as the relocatable file 90 in future.

It should be noted that in FIG. 14 and FIG. 15, the link processing block 94 directly outputs an execution-formatted file but this configuration also includes a case when the relocatable file 97 and the relocatable file 98 are created.

Moreover, the system setting procedure according to the third embodiment shown in FIG. 17 can involve optional selections for optimization and debug which will be reflected in the compile information 32 and the link information 37

As has been described above, the software development system according to the present invention as a built-in system software development system includes: means for providing modules of different operating system functions in a memory space as a relocatable execution-formatted file or object file; means for selecting a desired module by user from the modules provided; and means for extracting a section information about the selected module from the relocatable execution-formatted file so as to create a composite execution-formatted file. Thus, combining a plurality of execution-formatted files into a single composite execution-formatted file, it is possible to execute a program only by reading a single file. When replacing some of the execution-formatted files during an execution, this can be carried out only by discarding a corresponding text section and a corresponding initialization section allocated in a memory space, thus enabling to replace a module during an execution.

Consequently, it is possible to minimize the file size or memory size. When adding a system module, it is not linked as a library to an execution-formatted file. What should be doe is to add an execution-formatted file, which can be deleted when it has become unnecessary. Moreover, there is also a merit that a plurality of modules can be implemented without a file system.

Furthermore, by delivering a system module manly as a system execution-formatted file and a relocatable-file, it is possible to reduce the compile time at the user side. Alternatively, by providing a system object file from a library file, it is possible to reduce the compile time at the user side.

Thus, it is possible to select a desired module from a plurality of system execution-formatted files, enabling to constitute a program with the desired execution-formated file.

According to the present invention, it is possible to provide a built-in system software development system which is preferafble for a case when using an operating system enabling replacement of a module afterward.

What is claimed is:

1. A program creation apparatus for creating a program to be executed by a computing apparatus, said program creation apparatus comprising:

input means for inputting at least one execution-formatted file constituted by at least one of a text section containing a program code, a data section containing a data referenced by said program code, and an additional information section containing a data not referenced by said program code; and an internal configuration information retaining an information about at least one of said text section, said data section, and said additional information section;

text section extract means for extracting according to said internal configuration information, said text section from said execution-formatted file;

data section extract means for extracting according to said internal configuration information said data section from said execution-formatted file;

link order deciding means for deciding a link order between said text section of said execution-formatted file with said data section of said execution-formatted file; and internal configuration information link means that, according to said internal configuration information of said execution-formatted file, creates a link internal configuration information which is the information of said text section and said data section of said execution-formatted file which have been linked according to the order obtained from said link order deciding means.

2. A program creation apparatus as claimed in claim 1, said apparatus further comprising:

section link means that is supplied with said text section of said execution-formatted file from said text section extract means and creates a linked section linked according to said link order obtained from said link order deciding means while maintaining the contents of said text section and contents of said data section; and output means that discards a part of said additional information section and a part of said internal configuration information while maintaining said text section and said data section which are necessary for execution, and outputs said link internal configuration information and said linked section.

3. A program creation apparatus as claimed in claim 2, said apparatus further comprising:

relocatable file input means for inputting a relocatable file which can be relocated in a memory space; and execution-fomatted file creating means for relocating said relocatable file in said memory space so as to create said execution-formatted file, and having a function to add a relocatable file to said program.

4. A program creation apparatus as claimed in claim 3, said apparatus further comprising:

library input means for inputting a library file capable of creating said execution-formatted file; and relocatable file creating means for creating an object file relocatable from said library file, and having a function to add to said program a relocatable file obtained from said library file.

5. A program creation apparatus as claimed in claim 2, said apparatus further comprising:

select means for selecting any of a plurality of said execution-formatted files; and selected file input means for passing said execution-formatted file selected to said input means, and having a function to add to said program a desired one of said execution-formatted file.

6. A program creation method for creating a program to be executed by a computing apparatus, said method comprising steps of:

inputting at least one execution-formatted file constituted by at least one of a text section containing a program code, a data section containing a data referenced by said program code, and an additional information section containing a data not referenced by said program code; and an internal configuration information retaining an information about at least one of said text section, said data section, and said additional information section;

extracting according to said internal configuration information, said text section from said execution-formatted file;

extracting according to said internal configuration information said data section from said execution-formatted file;

deciding a link order between said text section of said execution-formatted file with said data section of said execution-formatted file; and according to said internal configuration information of said execution-formatted file, creating a link internal configuration information which is the information of said text section and said data section of said execution-formatted file which have been linked according to the order obtained from said link order deciding means.

7. A program creation method as claimed in claim 6, said method further comprising steps of:

inputting said text section extracted from said execution-formatted file so as to create a linked section linked according to said link order while maintaining the contents of said text section and contents of said data section; and discarding a part of said additional information section and a part of said internal configuration information while maintaining said text section and said data section which are necessary for execution and outputting said link internal configuration information and said linked section.

8. A program creation method as claimed in claim 7, said method further comprising steps of:

inputting a relocatable file which can be relocated in a memory space; and relocating said relocatable file in said memory space so as to create said execution-formatted file, so that said relocatable file is added to said program.

9. A program creation method as claimed in claim 8, said method further comprising steps of:

inputting a library file capable of creating said execution-formatted file; and creating an object file relocatable from said library file, so that a relocatable file obtained from said library file is added to said program.

10. A program creation method as claimed in claim 7, said method further comprising steps of:

selecting any of a plurality of said execution-formatted files; and passing said execution-formatted file selected to said input means, so that a desired one of said execution-formatted file is added to said program.

11. A storage medium containing a software program for program creation, wherein at least one execution-formatted file is inputted which file is constituted by at least one of a text section containing a program code, a data section containing a data referenced by said program code, and an additional information section containing a data not referenced by said program code; and an internal configuration information retaining an information about at least one of said text section, said data section, and said additional information section;

according to said internal configuration information, said text section is extracted from said execution-formatted file;

according to said internal configuration information, said data section is extracted from said execution-formatted file;

a link order is decided between said text section of said execution-formatted file with said data section of said execution-formatted file; and according to said internal configuration information of said execution-formatted file, a link internal configuration information is created by linking information of said text section and said data section of said execution-formatted file which have been linked according to the order obtained from said link order deciding means.

* * * * *